HOT-BOX DETECTOR

Original Filed June 30, 1958 3 Sheets-Sheet 1

INVENTORS
CORNELIUS A. GALLAGHER
WILLIAM M. PELINO
BY Mitchell & Berkert
ATTORNEYS

HOT-BOX DETECTOR

Original Filed June 30, 1958 3 Sheets-Sheet 2

INVENTORS
CORNELIUS A. GALLAGHER
WILLIAM M. PELINO
BY Mitchell & Bechert
ATTORNEYS

HOT-BOX DETECTOR

Original Filed June 30, 1958 3 Sheets-Sheet 3

INVENTORS
CORNELIUS A. GALLAGHER
WILLIAM M. PELINO
BY
Mitchell & Bechert
ATTORNEY United States Patent Office Re. 24,983
Reissued May 9, 1961

24,983

HOT-BOX DETECTOR

Cornelius A. Gallagher, Hicksville, and William M. Pelino, Garden City, N.Y., assignors to Servo Corporation of America, New Hyde Park, N.Y., a corporation of New York Original No. 2,947,857, dated Aug. 2, 1960, Ser. No. 804,061, Mar. 26, 1959, which is a division of application Ser. No. 747,553, June 30, 1958, now Patent No. 2,880,309, dated Mar. 31, 1959. Application for reissue Sept. 14, 1960, Ser. No. 56,072

4 Claims. (Cl. 246—169)

Matter enclosed in heavy brackets [ ] appears in the original patent but forms no part of this reissue specification; matter printed in italics indicates the additions made by reissue.

Our invention relates to an improved hot-box detector of the variety which is mounted alongside a railway track and which automatically remotely responds to the passage of an overheated journal box. This application is a division of Serial No. 747,553 filed June 30, 1958, which, in turn, is a continuation-in-part of application Serial No. 620,703, filed November 6, 1956, for Hot-Box Detector, and incorporates improvements over copending patent application Serial No. 506,125, filed May 5, 1955, in the name of Sabert N. Howell.

In hot-box detectors, as previously disclosed, heat-responsive cells have been imaged by appropriate optics so as constantly to observe the ends or covers of journal boxes of passing railroad cars. While such detectors provide an adequate aspect for the detection of certain relatively hot "hot-boxes" they are subject to disadvantages as, for example, the fact that the end of a journal box is usually a hinged lid and, as such, does not represent the warmest part of a journal box. Furthermore, any excessive heat development in the box is reflected at the end or cover only with the greatest time lag. Also, for any viewing aspect which involves general alignment with passing wheel axes, there is also alignment with brake shoes, which may be hot and which often are much hotter than a potentially dangerous hot-box; in addition, for the situation in which the journal-box lid may be missing, a direct axial viewing can develop a misleading signal. Thus, an axially directed viewing aspect is subject to certain definite limitations.

It is, accordingly, an object of the invention to provide an improved hot-box detector construction not subject to the above-noted limitations.

It is a further object of the invention to provide a hot-box detector for viewing the journal housing in a horizontal plane, at an acute angle relative to the axis of the train.

It is another object to provide an improved hot-box detector construction in which the optical viewing aspect may be such as to image the heat-sensitive cell or detector on a lateral side, such as the forward (or leading) side, or the rear (or trailing) side of passing journal boxes, as distinguished from the axial ends of such boxes.

It is still another object to provide a hot-box detector for viewing the journal housing behind the truck frame, or at the wheel-axle junction.

It is a feature of this invention to provide a hot-box detector which is capable of being mounted alongside the track for any of a plurality of aspects of viewing; e.g., vertical viewing, slant aspect viewing with the imaging axes being in a plane parallel to the rails, slant aspect viewing with the imaging axis being at an acute angle relative to the track, and viewing in a horizontal plane with the imaging axis being at an acute angle relative to the axis of the train.

It is a specific object to provide a device which may be bi-directionally responsive to passing railroad traffic, that is, which may respond to detected hot-boxes, regardless of the direction of traffic on the section of track being monitored.

It is another specific object to provide certain gating mechanisms in combination with journal-boxes of the character indicated.

Other objects and various further features of novelty and invention will be pointed out or will occur to those skilled in the art by a reading of the following specification in conjunction with the accompanying drawings. In said drawings, which show, for illustrative purposes only, preferred forms of the invention:

Briefly stated, our invention contemplates an improved hot-box detector of the variety in which a heat-responsive cell or element is fixedly mounted alongside a section of track to be monitored. Optics continuously image the cell either in the plane of passing journal boxes or on the wheel-axle junction, at an acute angle to the train, or inclined generally upwardly from beneath the passing boxes. The viewing axis is selected so that the viewing of brake shoes, steam-hose connections and the like is avoided. Novel gating means are described, whereby assurance is had that the region of prime interest on each passing journal box is monitored for deviation from normal temperature.

Figure 1:
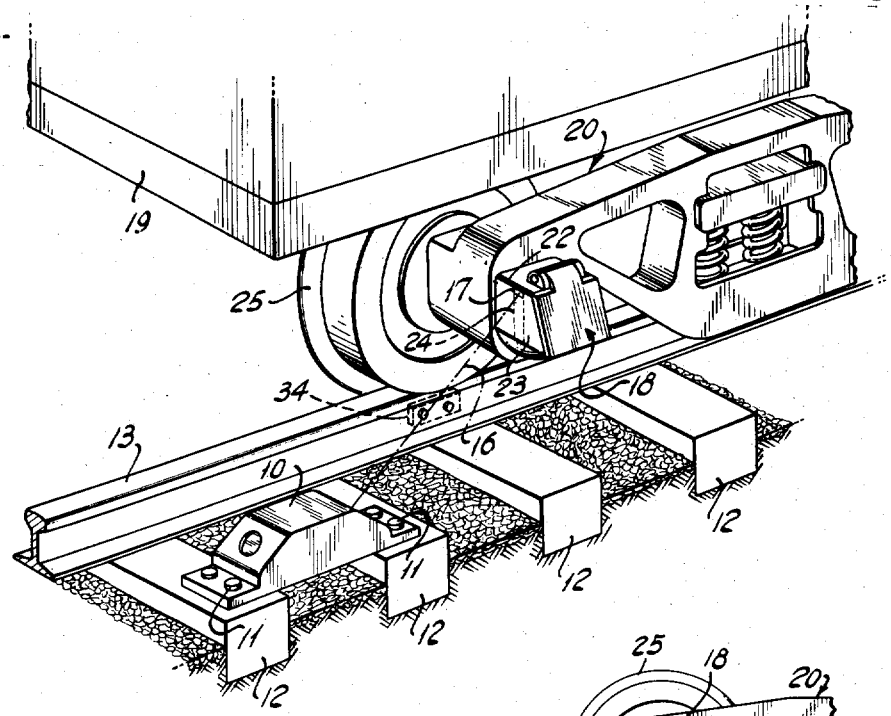
Fig. 1 is a fragmentary view in perspective showing a section of track to which our detector has been applied, showing the general geometry of the infra-red optics with respect to the journal box of a piece of rolling stock.
Figure 2:
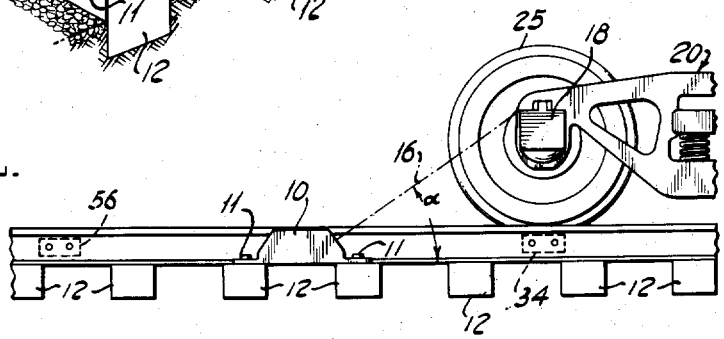
Fig. 2 is a view, on a reduced scale, showing a side or axial-end elevation of the arrangement of Fig. 1.
Figure 3:
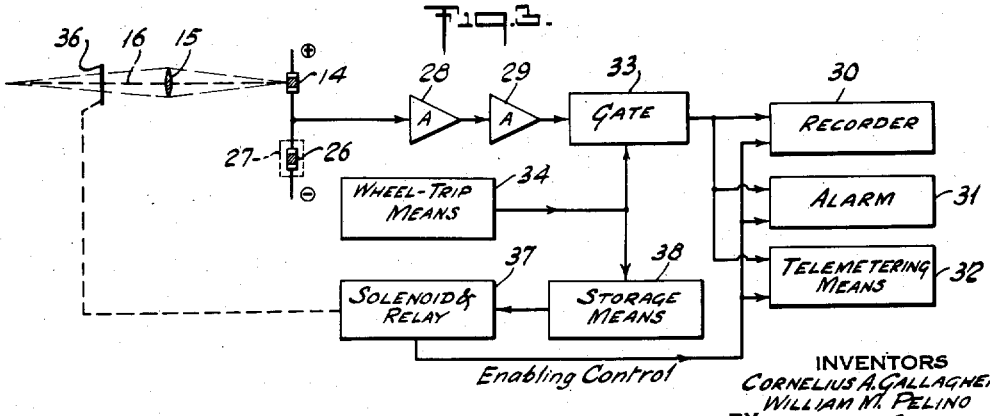
Fig. 3 is a diagram schematically depicting optical and elevational parts of the detector of Fig. 1.

Referring to Figs. 1, 2 and 3 of the drawings, the invention is shown in application to a detector unit contained within a housing 10, permanently mounted as by means 11 securing the same to adjacent cross-ties 12, supporting a section of track 13. The housing 10 may contain a low-heat-responsive or far-infra-red detector cell 14, such as a thermistor flake, and optics, such as an infra-red-transmitting lens 15, imaging the cell 14 along an axis 16, as at the location 17, in the general vertical plane of passing journal boxes 18. Usually, the detector 10 is provided in duplicate, for any single installation, there being a unit 10 on each side of the track to monitor simultaneously journal-box temperatures at both ends of the same axle.

Since hot-boxes are primarily a problem with freight cars, the rolling stock shown in Fig. 1 is a freight car having a main frame 19 overhanging the side frame 20 of one of its trucks, the journal box 18 forming an integral part of the truck structure 20. The viewing axis 16 in the embodiment illustrated in Fig. 2 slopes upwardly at an acute angle $\alpha$ which is preferably of the order of 20 to 50 degrees with the horizontal, and is aligned to observe the part of the journal box body which projects outwardly of the side frame 20; we have obtained very satisfactory results when the viewing angle was approximately 35 degrees in the vertical plane which paralleled the adjacent track 13.

It is to be noted that since the car frame 19 overhangs the journal box 18, the viewing thereof is such as to establish a more or less quiescent background level for the cell 14. In other words, except for the intervals between adjacent cars, the viewing axis 16 will either look directly at the underside of the car frame 19 or at a part of the journal box 18.

Thus, for this embodiment of forward-aspect viewing, that is, for a car 19 rolling in the direction toward the detector unit 10 (right to left in the sense of Fig. 1), the image 17 will first intercept the box 18 along the top edge 22 of the front lateral side 23. As the car proceeds further toward the detector 10, the image 17 scans down a path 24 on the front side 23 of the box 18, and for the box configuration shown, viewing on axis 16 will cover the whole side 23 and most of the bottom of the box 18. The important point to note about forward-aspect viewing (that is, viewing the oncoming or forward side of each journal box) is that the cell image 17 moves sharply from the relatively uniform and cool background level represented by the underside of the car 19 to the relatively warm upper edge 22 of the box 18. There is no gradual transition of temperature and, on the other hand, the gradient is virtually optimum, inasmuch as the upper part of a journal box is always the warmest part.

For trailing-aspect viewing, that is, for the situation in which the car 19 is traveling away from the detector 10 (left to right, in the sense of Fig 1), the viewing axis 16 will first intercept the box 18 on its underside, which is always cool relative to the upper side. Thus, the transition from low background level on the underside of the car to the level on the bottom of the box 18 will not involve as great a change in temperature as for the forward-viewing aspect situation described above. For trailing aspect, however, the temperature profile along the scanned path 24 will be steadily rising as the image 17 rises up the side 23, and the hottest part of the box will be the last viewed region.

Ordinarly, the cooling effect of onrushing air against the front side of a journal box, as compared with the relatively stagnant air on the rear or trailing side of a journal box, is sufficient to account for a considerable difference in measurable temperature between that at the top of the forward side of the box, as compared with that at the top of the trailing side of the journal box. Thus, it might be argued that best viewing is necessarily for a trailing aspect. This may all very well be true if the train is passing by at sufficient speed so that the detector cell 14 does not become insensitive. However, for slower speeds, system response is definitely degraded (because of low-frequency limitations) if temperature rise in the detector is not fast enough, even though the ultimate total temperature may be fairly substantial. The above discussion only serves to point out that forward-aspect viewing may be preferred over trailing-aspect viewing because the rate of change of measurable heat is greater, even though the maximum observable heat may not be of as great magnitude as that observable with rear-aspect viewing.

However, from the standpoint of cleanliness of the lens, trailing-aspect viewing is better, since the air stream from passing trains tends to sweep dirt away from the lens.

Our improved detector is equally applicable to forward, vertical or to rear-aspect viewing, but for the case of Fig. 3, forward-aspect viewing will be assumed; thus, the car 19 and its wheel 25 will be assumed to be rolling toward the detector unit 10 so that the cell 14 will be subject to the sudden change in temperature which occurs when the image 17 is first intercepted by the upper part of the side 23 of the journal box. For the arrangement shown, the cell 14 is employed in a polarized bridge circuit in which a similar cell element 26 is also connected; the element 26 is shielded, as suggested at 27, so as to provide an ambient or reference response against which the transient response of cell 14 may be compared. Bridge output passes first to a pre-amplifier 28 and then to a signal-amplifier 29, and, for certain applications, it is sufficient directly to utilize the heat-signal output of the amplifier 29, as by feeding the same to a recorder 30 and to alarm and telemetering means 31–32, as needed; alarm means 32 will be understood to function above a preset signal threshold level, representing a safety limit of journal-box temperature, as explained in said copending application. However, in the preferred form, we employ a gate 33 for the purpose of excluding all heat signals not attributable directly to response to the journal box 18.

The gate 33 may be triggered by a suitable wheel-trip, shown only in dotted outline 34 in Figs. 1 and 2, but described in complete detail in copending application Serial No. 627,330, filed December 10, 1956, in the name of Cornelius A. Gallagher et al. For installations employing separate detectors 10 on opposite sides of the track, to monitor simultaneously both journal boxes on the same axle, it will be understood that the same trip 34 can serve both detectors 10. It suffices here to say that the trip 34 may be one of a number of varieties, and in said copending application the trip 34 comprises merely a magnetic circuit including a gap which is transiently closed by the flange of the wheel 25. A winding coupled to this magnetic circuit develops the trip signal. Preferably, the wheel-trip means includes a storage circuit as, for example, a monostable multivibrator or a time-delay drop-out relay, whereby the trip signal fed to the gate 33 for the purpose of opening the same is of a duration great enough to allow cell response at least to the top of side 23 of the journal box 18.

The location of the wheel-trip 34 with respect to the housing 10 should be such that the gate 33 will open just prior to imaging the cell at the top edge 22, regardless of the speed of the train. The length of time that gate 33 remains open should permit viewing of at least the upper part of the side 23, even for the slowest trains. For example, a gate interval of 50 milli-seconds is found adequate even for trains passing at five miles an hour; such a gate interval is found to present no limitation on detector performance, even for the fastest freight trains.

In order to protect the internal parts of the housing 10 during periods when no trains are passing, we prefer to employ shutter means 36 to close and open a viewing aperture in the housing 10, the shutter means 36 remaining open as long as a train is passing the detector 10. The wheel-trip 34, in conjunction with a relatively long time-constant storage device 38, may provide the actuating signal for a shutter-opening solenoid 37. Thus, if the time-constant at 38 is long enough to maintain a shutter-opening signal to solenoid 37 for the slower speed trains, as for example, down to five miles an hour, the shutter 36 will also remain open for all greater train speeds. When the train passes completely, the storage device 38 will fail to excite solenoid 37 and the shutter 36 will close, as by spring or gravity-operated means, to await the next train.

The discussion thus far has concerned itself with the problem of detecting hot-boxes on trains coming always in the same direction down a given length of track being monitored by the detector 10. However, it is a feature of our invention for slant viewing in a plane parallel to the rails that our detector be automatically responsive to monitor oncoming hot-boxes from a given aspect regardless of the direction of traffic along the track; for example, our detector incorporates automatic means for sensing the direction of oncoming traffic and for selecting the appropriate response aspect in accordance with the sensed direction of traffic. For such purposes, we illustrate in Fig. 4 the employment of a detector assembly 10, comprising optical systems having essentially duplicate or conjugate response axes 16—16', the axis 16 being as described in connection with Figs. 1 and 2, and the axis 16' being the substantial reverse, i.e., looking in the opposite direction from the axis 16.

Figure 4:
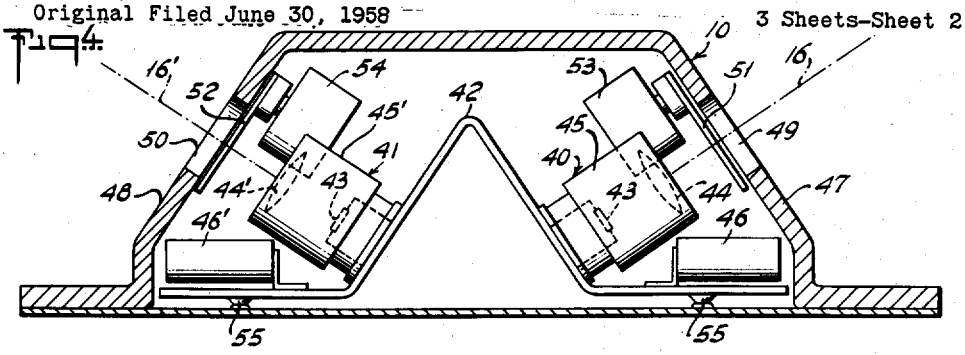
Fig. 4 is a sectional view through the housing of the detector of Fig. 1, showing the internal organization of optical parts in side elevation.

In the form shown in Fig. 4, duplicate detecting systems 40—41 are mounted on the same chassis 42. Each such system is shown to comprise a cell unit 43—43' and an infra-red transmitting lens 44—44', mounted in an adjustable focusing barrel 45—45'. Pre-amplifiers 46—46' may be mounted close to the cells 43—43', and the entire assembly is contained within a rugged housing having sloping side walls 47—48 to face oncoming traffic. Openings 49—50 in the walls 47—48 permit viewing on a selected one of the axes 16—16', when one of the shutters 51—52 has been actuated by its solenoid 53 or 54, as the case may be. The entire assembly of internal components may be shock-mounted, as suggested at 55.

For any particular desired viewing aspect, say, the forward-viewing aspect, it will be necessary to employ a first wheel-trip, as at 34, to determine a first gate opening for trains approaching from the right (in the sense of Fig. 2), and a second similar wheel-trip 56 on the other side of the detector 10 to determine a second gate opening for trains approaching from left to right, in the sense of Fig. 2. These same two wheel-trips 34—56 also preferably serve to determine automatically the direction of approach of a particular passing train, for purposes of opening the correct shutter 51 or 52, as will be made clear from the discussion of Fig. 5.

Figure 5:
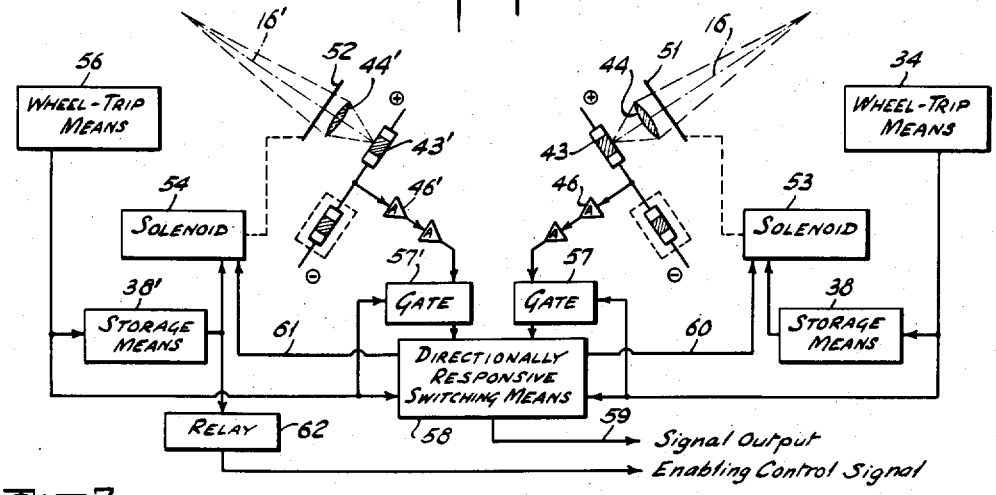
Fig. 5 is a diagram similar to Fig. 3, but illustrating application of the principles of Fig. 3 to a bi-directionally responsive detector.

In the arrangement of Fig. 5, the symbolism and [function] *functional* components follow generally the scheme illustrated in Fig. 3, except that the system is automatically responsive regardless of the direction of oncoming traffic. Thus, the electrical components, up to and including separate gates 57—57' for the respective cells 43—43', correspond with those shown and described at 14—33 in connection with Fig. 3.

Now, for trains approaching from the right (in the sense of Fig. 2), and for the assumed case of forward-aspect viewing, the viewing axis 16 must be utilized to the exclusion of the viewing axis 16'. To achieve this selection automatically, we show directionally-responsive switching means 58 having the inputs connected to both of the wheel-trip devices 34—56 and effective to respond directionally to the onset of the impulse received from the first wheel-trip device to be actuated. For the assumed case, such first impulse will be developed by the trip 34, which is thus effective to control the switching means 58, in the sense establishing connection of the output of gate 57 to a single signal-output line 59. Had the direction of approach been from left to right (in the sense of Fig. 2), trip 56 would have developed the first control impulse, and switching means 58 would have been switched to connect output of gate 57' to the signal output line 59, as will be understood.

Since switching means 58 must change its state in order to establish one or the other of the described connections to signal-output line 59, we use such changes of state as a means for controlling operation of one of the shutter solenoids 53—54, as suggested by control connections 60—61. Thus, coincidentally with connecting gate 57 to output line 59, solenoid 53 is actuated to open the shutter

51, to the exclusion of shutter 52. The heat signals developed in output line 59, therefore, correctly reflect only viewing on the axis 16, and it will be understood that for [approach] *approach* of traffic from the other direction, the heat signal (in line 59) will reflect viewing only on the axis 16', to the exclusion of the axis 16. Once a selected one of the shutter-opening solenoids has been operated, and assuming that the passing train is proceeding with sufficient speed, storage means 38 or 38', as the case may be, is effective to maintain the open-shutter connection as long as the train is passing.

The heat-signal present in line 59 may be fed to recorder, alarm, or telemetering means, as explained in connection with Fig. 3. The functioning of such devices need not be dependent upon the direction of passage of a train, and, therefore, a single relay 62, functioning, say, from the storage means 38', will suffice to develop a control signal for enabling or turning on the recorder, alarm, or telemetering means, only as long as the train is passing the box-temperature monitoring point.

The discussion above in connection with the circuits of Figs. 3 and 5 has assumed the case of forward-aspect viewing on oncoming journal boxes. In such event, it has been explained that a constant relatively short-delay factor, or storage function, incorporated in the wheel-trip means 34 or 56, suffices to control the gate 33, 57, or 57'. This is because the detector responds best to relatively quick changes in heat, and for forward-aspect viewing, the greatest change will be observed when the image 17 first strikes the top or leading edge 22 of the journal box 18; it really matters not what the rest of the heat profile around the box may be, as long as this first strongly contrasting heat change is observed.

Figure 6:
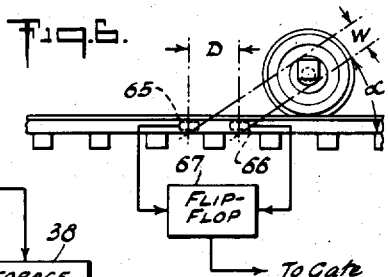
Fig. 6 is a simplified diagram illustrating a special-purpose wheel trip for a particular use of the detector of Fig. 3.
Figure 6:
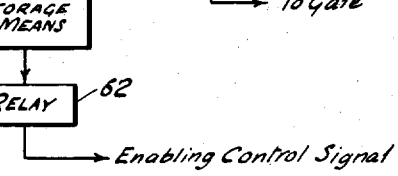

With trailing-aspect viewing, on the other hand, it is of greatest importance that the gate 33, 57, or 57', once opened, shall remain open long enough for the cell image 17 to scan all the way up to the top rear edge of the journal box. Naturally, the time required to achieve this will be different for different train speeds, and in Fig. 6 we show a modified trip device to meet the need for adequate response, regardless of train speed, particularly for trailing-aspect viewing. In the arrangement of Fig. 6, each wheel-trip incorporates dual trip elements 65—66, each of which develops a separate control pulse determining the "on" and the "off" functioning of a flip-flop circuit 67. By setting the spacing D between trips 65—66 to correspond to the effective projected observable width W of a journal box, one can be sure that the signal output from the flip-flop circuit 67 is a square gating pulse effective to control the gate during the full period of exposure to the journal box. By inspection of the trigonometry of Fig. 6, the spacing D is preferably at least substantially the journal-box width W, divided by the sine of the elevation angle $\alpha$ of the viewing [axle] *axis* 16.

Figure 7:
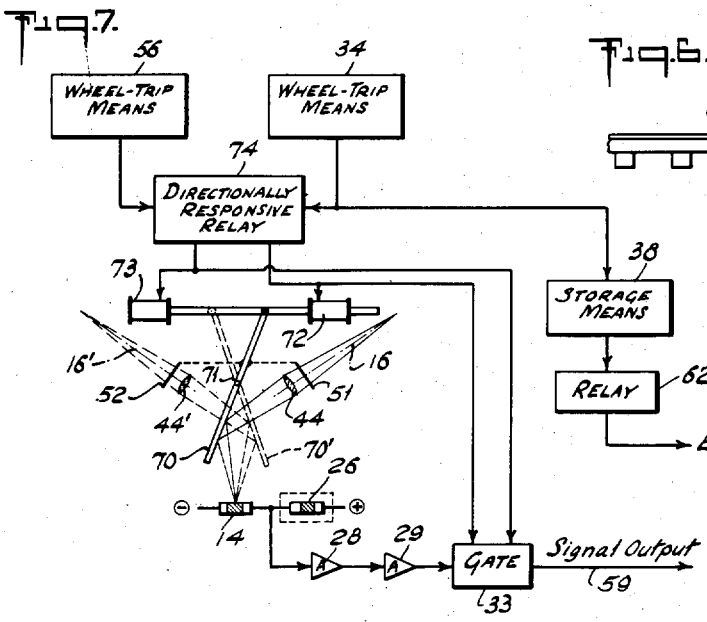
Fig. 7 is a diagram illustrating an alternative for the arrangement of Fig. 5.

In the arrangement of Fig. 7, we provide for mechanical accomplishment of some of the functions described in greater detail in Fig. 5. Dual lens and shutter systems 44—44' and 51—52 may be employed but in connection with a single detector cell 14, thus obviating the need to switch heat outputs in accordance with the detected direction of approach of a train. In the form shown, a plane mirror 70 is pivoted at 71 and is positionable either as shown in full lines or as shown in dashed outline 70'. Solenoids 72—73 are in actuating relation with mirror 70 and they respond to directionally responsive relay means 74 in the manner described at 53—54—58 in Fig. 5. Thus, for forward-aspect viewing, and for a train approaching from right to left in the sense of Fig. 7, trip 34 will be actuated prior to trip 56, thereby causing relay 74 to actuate solenoid 72 and to move mirror 70 to the position shown in full outline, whereby shutter 51 is opened and cell 14 is caused to view on axis 16, via mirror 70; with a suitable delayed drop-out function for relay 74, this mechanical setting may be maintained for the full length of the passing train. For forward-aspect viewing of trains approaching in the opposite direction, relay 74 will be effective to set and hold mirror 70 in the position 70' and to open shutter 52, thus causing cell 14 to view on the axis 16' via mirror 70. For trailing-aspect viewing the control function of relay 74 will be understood to be reversed from that described for forward-aspect viewing.

The aspect of viewing constitutes an important part of our invention. As explained previously, the prior axial end-on viewing has never met with commercial success because of the many disadvantages discussed earlier in the specification. Slant-aspect viewing solved many of the problems existent in the prior devices.

Other aspects of viewing which may also be satisfactorily utilized are illustrated in Figs. 8–11.

Figure 8:
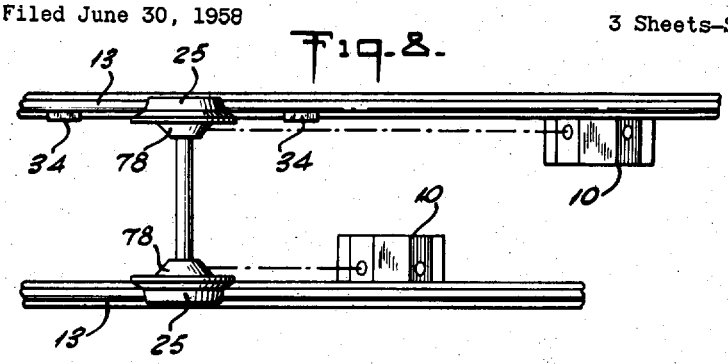
Fig. 8 is a partial diagrammatic plan view of the detector arranged for slant aspect viewing of the wheel-axle junction.

Referring first to Fig. 8, the detectors 10 are mounted inside the tracks 13 for viewing the wheel-axle junctions 78. It is now known that the heat in the wheel-axle junction is related to the heat in the journal box. The journal box condition may, therefore, be investigated by detecting the heat at the wheel-axle junction. Thus, in this embodiment, the detectors are mounted for slant-aspect viewing, but of the wheel-axle junctions rather than of the journal boxes. The wheel-trip devices and the circuits for applying the heat signal information to the telemetering equipment are the same as previously described and, therefore, have been omitted from this figure.

Figure 9:
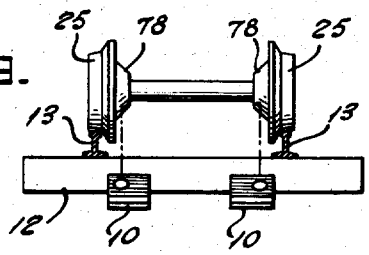
Fig. 9 is an end view showing a pair of wheels on a section of track with the detector mounted for vertical aspect viewing of the wheel-axle junction.

Fig. 9 is an alternative arrangement of that shown in Fig. 8. In this arrangement, the detectors are mounted for vertical-aspect viewing of the wheel-axle junction. Although this arrangement has the disadvantage of the detector being exposed more fully to dirt, weather, etc., it has certain definite advantages. For example, one viewing unit is sufficient for detecting traffic in either direction. [Further, there is less possibility of the detector viewing sky and other extraneous background which may cause false signal indications.]

Figure 10:
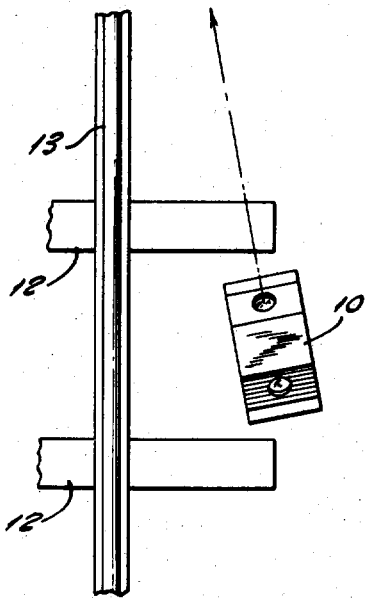
Fig. 10 is a plan view of a detector mounted at an acute angle relative to the track for either horizontal plane aspect viewing or slant aspect viewing.

Fig. 10 illustrates an alternative embodiment of slant-aspect viewing differing somewhat from Fig. 1. In Fig. 1, the viewing image axis is in a plane parallel to the track. In Fig. 10, however, the detector 10 is mounted at an angle, for example 10 degrees, to the track and either at track level or between track level and the plane of the journal box. With the detector 10 at track level, there is little real difference between the two embodiments; however, with the detector elevated to a position between the track level and the plane of the journal box, there are several real advantages in this embodiment.

For example, detection of *direct sunlight and* sun reflections is less likely with the horizontal-plane viewing. [Further, the body of the car provides a background for the detector, whereas in slant-aspect viewing the background very often is sky.] Moreover, with the detector mounted at an angle to the track and raised from the track bed, greater flexibility of vertical angle viewing is possible.

Figure 11:
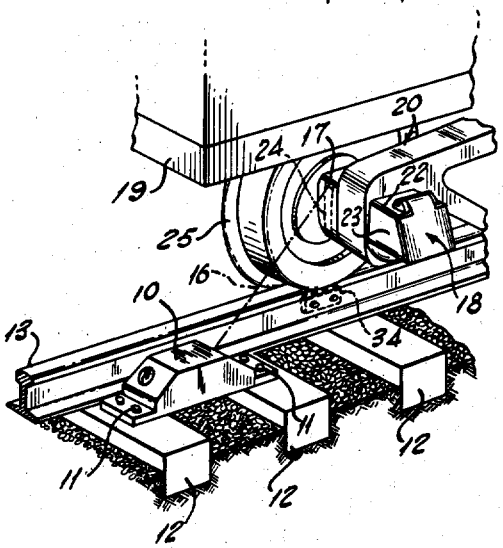
Fig. 11 is a perspective view similar to Fig. 1, except that the area of the journal box being viewed is behind the truck frame.

Fig. 11 illustrates still another aspect of journal box viewing. In Fig. 1, the image of the heat-sensitive cell traverses a hot-box portion forward of the frame 20. In Fig. 11, the journal housing behind the frame is being scanned.

Generally, an area 3" wide is accessible for scanning at the rear of the frame with no obstructions in the field of view. The uniformity of heat information for this area of scan has been found excellent and even superior to that obtained by scanning the forward portion of the journal box. This form of scanning is also less subject to sunlight reflections.

It will be seen that we have described a relatively simple detector mechanism having improved means for discriminating troublesome hot-boxes. With our arrangement, the discrimination problem itself is in fact simplified, in that the background level is not cluttered with the numerous heat sources which have previously served only to mask the desired journal-box signals. Furthermore, our improved viewing aspects provide for greatest rate of change of observable journal-box signal, regardless of train speed, for virtually the entire range of train speeds. Also, our device lends itself to effective operation in the presence of bi-directional traffic on the same length of track.

While we have described our invention in detail for the preferred forms shown, it will be understood that modifications may be made within the scope of the invention as defined in the claims which follow.

We claim:

1. A railroad hot-box detecting device, comprising a housing mounted alongside a length of railroad track, said housing containing an infrared-radiation detector producing an electrical signal in response to incident radiant energy, said housing having a viewing opening therein, optical means within said housing and imaging said detector externally of said housing and along an axis passing through said opening and in a direction to view passing journal boxes or axles, shutter means carried by said housing externally of said optical means and having an open position externally exposing said detector on said axis, said shutter means having a closed position closing said opening and protecting both said optical means and said detector, whereby said detector is necessarily exposed to an internal part of said shutter means when in closed position, actuating means for said shutter means including a wheel-operated trip responsive to the presence of a wheel on the track near said housing and producing an electrical impulse for each passing wheel, said actuating means further including a storage device operated by such impulses, said storage device having a time constant at least sufficient to keep said shutter means continuously open for recurring wheel-trip impulses of a periodicity representing relatively slow passage of a train past said hot-box detecting device.

2. A railroad hot-box detecting device, comprising a housing mounted alongside a length of railroad track, said housing containing an infrared-radiation detector producing an electrical signal in response to incident radiant energy, said housing having a viewing opening therein, optical means within said housing and imaging said detector externally of said housing and along an axis passing through said opening and in a direction to view passing journal boxes or axles, shutter means carried by said housing externally of said optical means and having an open position externally exposing said detector on said axis, said shutter means having a closed position closing said opening and protecting both said optical means and said detector, whereby said detector is necessarily exposed to an internal part of said shutter means when in closed position, and actuating means for said shutter means comprising a device responsive to the presence of a train on said track and actuating said shutter means to open position only substantially as long as the train is [one] *on* the track and near said housing.

3. A railroad hot-box detecting device, comprising a housing mounted alongside a length of railroad track, said housing containing an infrared-radiation detector producing an electrical signal in response to incident radiant energy, said housing having a viewing opening therein, optical means within said housing and imaging said detector externally of said housing and along an axis passing through said opening and in a direction to view passing journal boxes or axles, shutter means carried by said housing externally of said optical means and having an open position externally exposing said detector on said axis, said shutter means having a closed position closing said opening and protecting both said optical means and said detector, whereby said detector is necessarily exposed to an internal part of said shutter means when in closed position, and actuating means for said shutter means including a storage circuit and a wheel-operated generator connected to said storage circuit and producing an electrical impulse for each passing wheel, said storage circuit having an input adapted to receive an impulse signal, said storage circuit producing a shutter-opening signal for said shutter means in response to an input impulse signal and having a storage time constant effective to hold said shutter means open for a period of time at least equal to the greatest interval between successive wheel-trip impulses for a passing train traveling at the minimum response speed of said hot-box detecting device.

4. The device of claim 3, said shutter means and said storage circuit being adapted to close said shutter means upon lapse of said period of time.

References Cited in the file of this patent or the original patent

UNITED STATES PATENTS

| | | |
|---|---|---|
| 1,972,682 | FitzGerald | Sept. 4, 1934 |
| 1,985,563 | FitzGerald | Dec. 25, 1934 |
| 2,341,545 | Hagenbook | Feb. 15, 1944 |
| 2,818,508 | Johanson et al. | Dec. 31, 1957 |
| 2,856,539 | Orthuber et al. | Oct. 14, 1958 |